(12) United States Patent
Wood

(10) Patent No.: US 6,417,500 B1
(45) Date of Patent: Jul. 9, 2002

(54) SOLAR RADIATION SENSOR

(76) Inventor: John Graham Wood, Sunnybank House, Wensley Road, Winster, Derbyshire DE4 2DH (GB)

( * ) Notice: Subject to any disclaimer, the term of this patent is extended or adjusted under 35 U.S.C. 154(b) by 0 days.

(21) Appl. No.: 09/508,452
(22) PCT Filed: Sep. 4, 1998
(86) PCT No.: PCT/GB98/02668
§ 371 (c)(1), (2), (4) Date: Mar. 9, 2000
(87) PCT Pub. No.: WO99/13359
PCT Pub. Date: Mar. 18, 1999

(30) Foreign Application Priority Data

Sep. 10, 1997 (GB) .............................. 9719614

(51) Int. Cl.⁷ ................. G01C 21/02; G01C 21/24; G01J 1/20
(52) U.S. Cl. ............... 250/203.4; 250/237 R; 250/206.1; 250/206.2
(58) Field of Search ............ 250/203.4, 203.1, 250/203.2, 203.3, 206.2, 237 R, 206.1; 356/139.01, 139.02; 244/173

(56) References Cited

U.S. PATENT DOCUMENTS 4,933,550 A * 6/1990 Hegyi ........................ 250/237
6,274,862 B1 * 8/2001 Rieger ........................ 250/216

FOREIGN PATENT DOCUMENTS

| GB | 2 023 812 A | 1/1980 | |
| GB | 2 266 145 A | 10/1993 | |
| GB | 2266145 A | * 10/1993 | |
| GB | 2266146 A | * 10/1993 | G01W/1/12 |
| JP | 58 190729 A | 11/1983 | |

OTHER PUBLICATIONS

Michael D. Steven, Standard Distributions of Clear Sky Radiance, pp. 457–465.
M.D. Steven and M.H. Unsworth, Shade–ring Corrections for Pyranometer Measurements of Diffuse Solar Radiation from Cloudless Skies, pp. 865–872.
M.D. Steven, The Anisotropy of Diffuse Solar Radiation Determined from Shade–ring Measurements, pp. 261–270.

* cited by examiner

Primary Examiner—Robert H. Kim
Assistant Examiner—Courtney Thomas
(74) Attorney, Agent, or Firm—Cantor Colburn LLP

(57) ABSTRACT

A radiation sensor with particular application to detection of sunshine has at least two (but typically seven) light sensitive detectors and a masking element. The masking element has a pattern of translucent and opaque areas which are disposed to ensure that at any time at least one detector can be exposed to direct sunlight (if the sun is shining) through a translucent area and at least one detector is shaded from direct sunlight by an opaque area. Signal processing apparatus analyses signals from the detectors, such analysis including a comparison of the signal from the detector exposed to the most light and the signal from the detector exposed to the least light.

32 Claims, 5 Drawing Sheets

SOLAR RADIATION SENSOR

TECHNICAL FIELD

The present invention relates to a radiation sensor, which has particular, but not exclusive, application as a solar radiation sensor for use, for example, in recording duration and/or intensity of sunshine.

BACKGROUND OF THE INVENTION

For many years, hours of sunshine has been part of the range of meteorological information recorded at monitoring stations throughout the world. The most widely used meteorological recorder is the Campbell-Stokes recorder which uses a spherical lens to focus the sun's rays to a point to burn a track on a strip of recording paper. Use of a Campbell-Stokes recorder is labour-intensive because the recording paper must be replaced manually each day.

Weather recording has on the whole become more automated, with most measurements being made by automatic instruments which can, if need be, operate entirely unattended and send their data to a remote monitoring station. As a result of this, there is a disincentive to equip a weather station with a Campbell-Stokes recorder since doing so would negate many of the benefits achieved through automation of other measuring instruments. This has meant that there is a growing gap in the climate record for sunshine information as existing Campbell-Stokes recorders are discarded and not replaced. This is occurring at a time where accurate climatic knowledge is vital to enable monitoring of climate change, and during a period of growing interest in solar power, and optimisation of crop growth in agricultural sciences, all of which applications benefit greatly from sunshine data.

There have been attempts to provide an alternative type of sunshine sensor. These sensors have, for the most part, operated by comparing the outputs of two detectors, one of which is shaded from direct sunshine and the other of which is in open sun. Shading of one of the detectors is usually done with a shade ring, which is set to obscure the track of the sun across the sky as seen by the shaded detector. Correct positioning of the shade ring varies seasonally as the solar declination varies by over 46° from June 21st to December 21st, and is dependant upon many variables including the latitude and longitude of the sensor's location and proper alignment with true north. Moreover, improper positioning of the shade ring can give results which are incorrect, but which might not appear to be obviously wrong so that errors could go unnoticed. As a result, this type of instrument is not suited to unattended operation.

SUMMARY OF THE INVENTION

An aim of the invention is to provide a recording instrument which can make accurate measurements of direct and diffuse sunlight, and calculate sunshine hours from this data, and which can operate with a minimum of manual intervention.

According to a first aspect of the invention there is provided a sunlight sensor comprising at least two light sensitive detectors and a masking element, and characterised by the masking element having a pattern of translucent and opaque areas which are disposed to ensure that at any time at least one detector can be exposed to direct sunlight through a translucent area and at least one detector is shaded from direct sunlight by an opaque area.

In conditions of sunshine, regardless of the position of the sun in the sky, a great amount more light will be received by a detector which is exposed to the sun through a translucent area than will be received by a detector which is shaded from direct sunlight by an opaque area of the masking element. All of the detectors also receive light from all parts of the sky away from the sun. In cloudy conditions, the difference in the amount of light received by two such detectors will be less. This is true irrespective of the absolute intensity of the sunlight.

The opaque areas of the masking element may be provided by a cut out mask of card, metal, plastic sheet or any other suitable material (the translucent areas thus being nothing more than absence of such material).

The masking element may be disposed within an at least partly translucent cover of the-sensor.

In a particularly preferred arrangement, opaque areas of the masking element are constituted by an opaque pattern applied to an at least partly translucent cover of the sensor. In such embodiments, the pattern of opaque areas can be formed, for example, by coating an internal surface of the cover in selected areas by printing, painting or spraying an opaque coating onto the internal surface, or applying thin opaque material thereto. The cover may include a hemispherical dome of, for example, transparent plastic material.

The light sensitive detectors may be arranged in a symmetrical pattern. They may be carried on a generally flat support. In embodiments in which a cover is provided, it preferably covers all of the detectors.

A sensor embodying the invention may have two light sensitive detectors, but more commonly has a greater number, six or seven being typical. In embodiments which have six detectors, they may be arranged equiangularly and equidistantly spaced from a centre point. In an alternative embodiment, six detectors may be disposed in such a manner, with a seventh placed at the centre point. Clearly other symmetrical or asymmetric arrangements may be used.

The pattern of translucent and opaque areas of the masking element may comprise alternating translucent and opaque bands extending as areas of a hemispherical locus. The translucent and opaque areas preferably are of equal area.

The translucent areas may be nothing more than areas in which a light-obscuring medium used to form the opaque areas is absent. The opaque areas may be symmetrical with respect to a diametric line of symmetry. Alternatively, the pattern of opaque areas may be such that areas in one diametrical half of the hemispherical locus are symmetrically opposite translucent areas in its other half. In embodiments which include a dome-shaped cover, the hemispherical locus typically is coincident with an inner surface of the dome.

A sensor embodying the invention does not require directional alignment in order to operate properly, but needs only to be horizontally levelled. The pattern of opaque and translucent areas is such that the orientation of the sensor is irrelevant to the operation of the sensor.

In another of its aspects, the invention provides a method of distinguishing between sunshine and overcast weather conditions characterised by placing a sensor according to the first aspect of the invention in a position where it is liable to be exposed to sunlight, assessing signals derived from each of the detectors, and comparing the signals derived from the detector exposed to the greatest and to the least amount of light.

The operating principle of the present invention can be applied more generally to create a sensor to distinguish between conditions of diffuse and point source of a wide range of different types of radiation. Therefore, from yet another aspect, the invention provides a radiation sensor comprising at least two radiation sensitive detectors and a masking element, and characterised by the masking element having a pattern of areas which are opaque to the radiation and which are transparent to the radiation which areas are disposed to ensure that at any time at least one detector can be exposed to direct radiation through a non-opaque area and at least one detector is shaded from direct radiation by an opaque area irrespective of where a point source of radiation might be positioned within a detection field.

By provision of suitable detectors and material from which the opaque areas may be made, such a sensor can be used ti detect many different types of radiation including radiation in a large part of the electromagnetic spectrum and radiation of subatomic particles.

BRIEF DESCRIPTION OF THE DRAWINGS

A preferred embodiment of the invention will now be described in detail by way of example with reference to the accompanying drawings in which.

DETAILED DESCRIPTION OF THE PREFERRED EMBODIMENT

Figure 1:
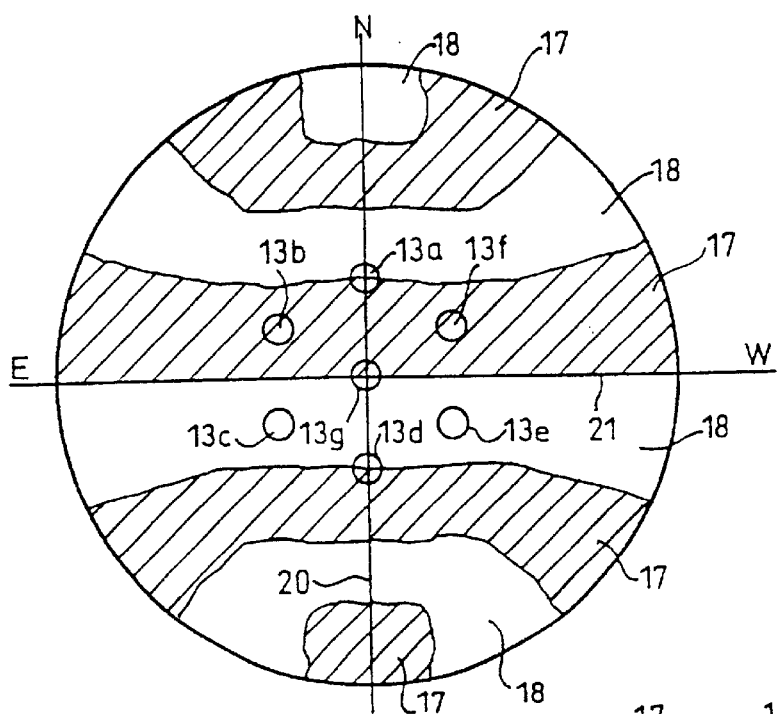
FIG. 1 is a plan view of a sunshine sensor embodying the invention.
Figure 2:
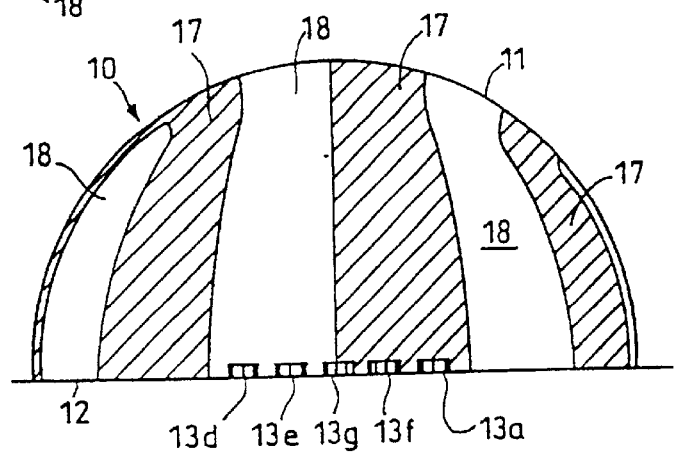
FIG. 2 is a side elevation of the detector of FIG. 1.
Figure 3:
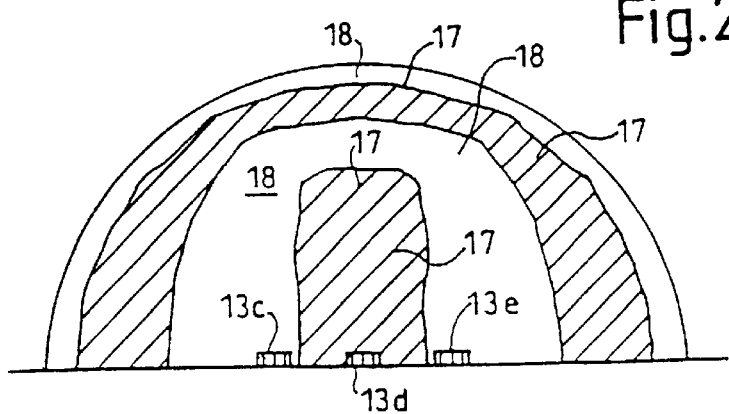
FIG. 3 is an end elevation of the detector of FIG. 1.
Figure 4:
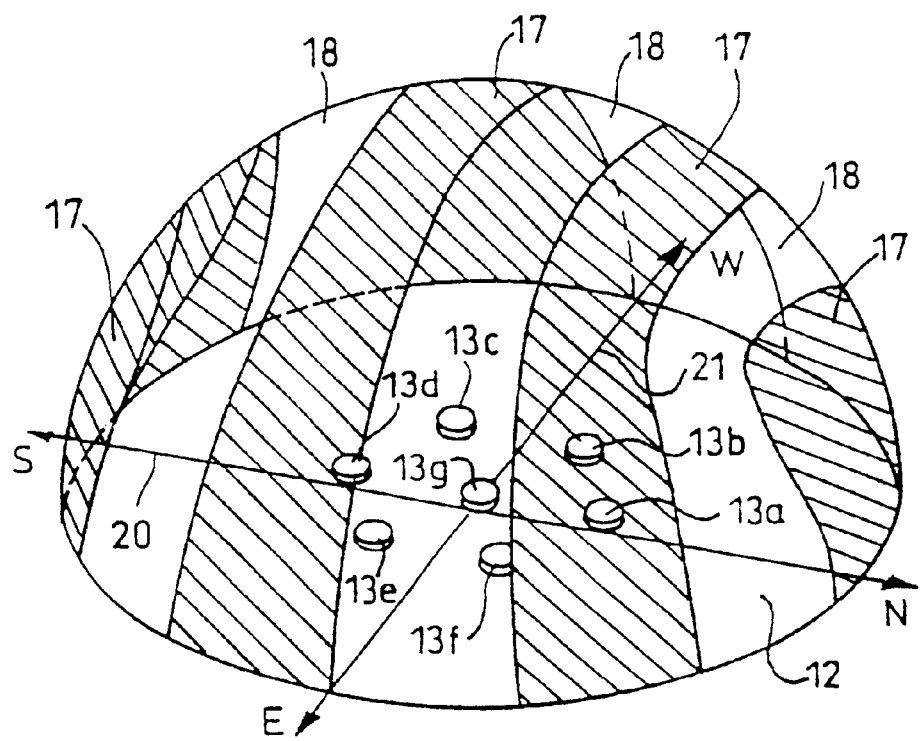
FIG. 4 is an isometric view of the detector of FIG. 1.

As shown in the drawings, a sunshine sensor 10 being a preferred embodiment of the invention comprises includes a cover 11 formed as a hemispherical dome carried on a flat base plate 12. An area of the base plate 12 beneath the cover 11, carries seven light-sensitive detectors, which are in this embodiment, photo diodes 13 which serve as light detectors. Processing circuitry 14 is disposed in a housing 16 below the base plate 12 (See FIG. 5).

The cover 11 comprises a hemispherical dome of transparent plastic material. On an inner surface of the dome opaque material is deposited in a pattern such that the cover 11 has areas 17 which are opaque (where the opaque material has been deposited) and areas 18 which are translucent (where there is no such material). The pattern is symmetrical with respect to a first diametrical axis 20, such that one half of the cover 11 is a mirror image of the other half. With respect to a second axis 21, extending normally the first axis, the pattern is symmetrical in shape, but is reversed in the sense that a point on one side of the second axis which is in an opaque area corresponds with a point on the opposite side of the axis which is in a translucent area.

The photo diodes 13 are arranged such that a first of them 13g is central below the cover 11 at the intersection of the first and second axes 20,21. The other six photodiodes 13a ... 13f are located at the vertices of a regular hexagonal locus centred upon the first photodiode 13g.

Figure 5:
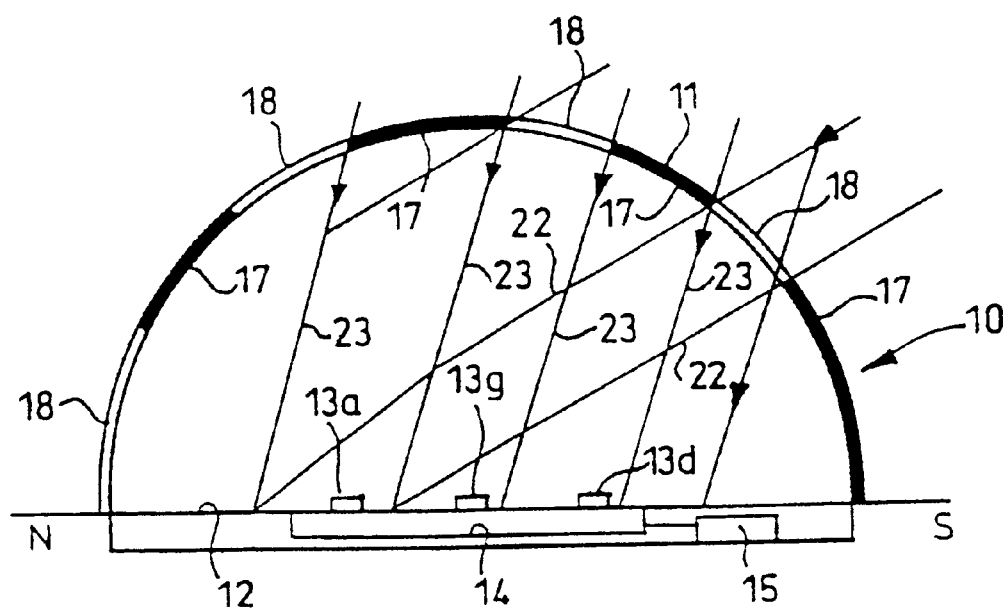
FIG. 5 is a sectional view of the detector of FIG. 1, showing the effect of variation in solar declination.
Figure 6:
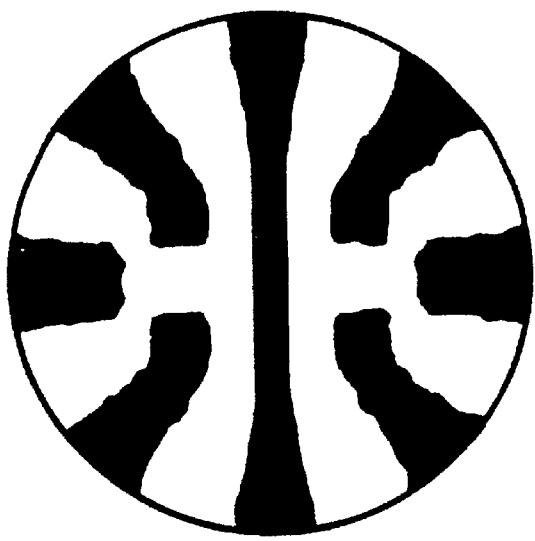
FIGS. 6 to 9 are representations of alternative patterns of masking elements suitable for use in various embodiments of the invention.
Figure 7:
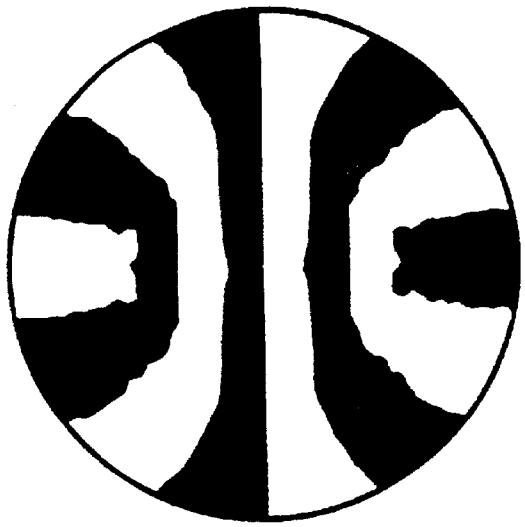
Figure 8:
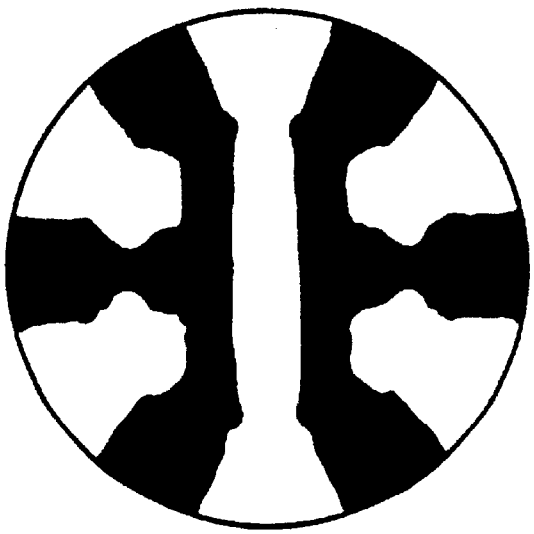
Figure 9:
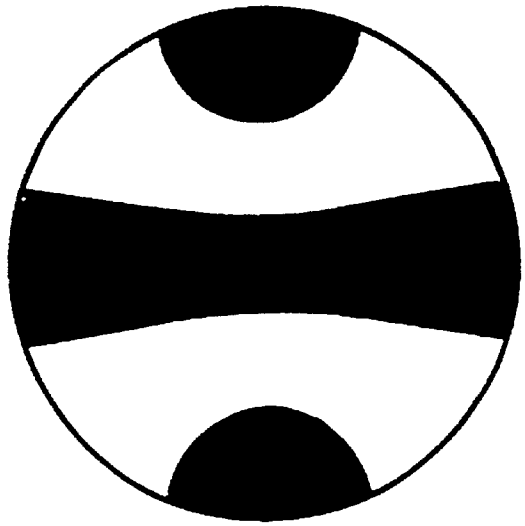

The effect of variation in the altitude of the sun, due to diurnal motion, or seasonal change in declination is illustrated in FIG. 5. In a lower altitude of the sun, rays 22 impinge upon the detector 13a, leaving other detectors such as 13g, or 13d, in the shade cast by an opaque area 17. In a higher altitude, e.g. at midsummer noon, at least detector 13g, is illuminated by direct solar radiation by rays 23, whilst detectors 13a, and 13d, are in shade.

At any time, the detector or detectors 13 illuminated by direct sunlight provide a measure of the intensity of direct sunlight whilst the shaded detectors 13 measure the intensity of diffuse sunlight which impinges upon them from all directions other than from the sun directly.

Figure 10:
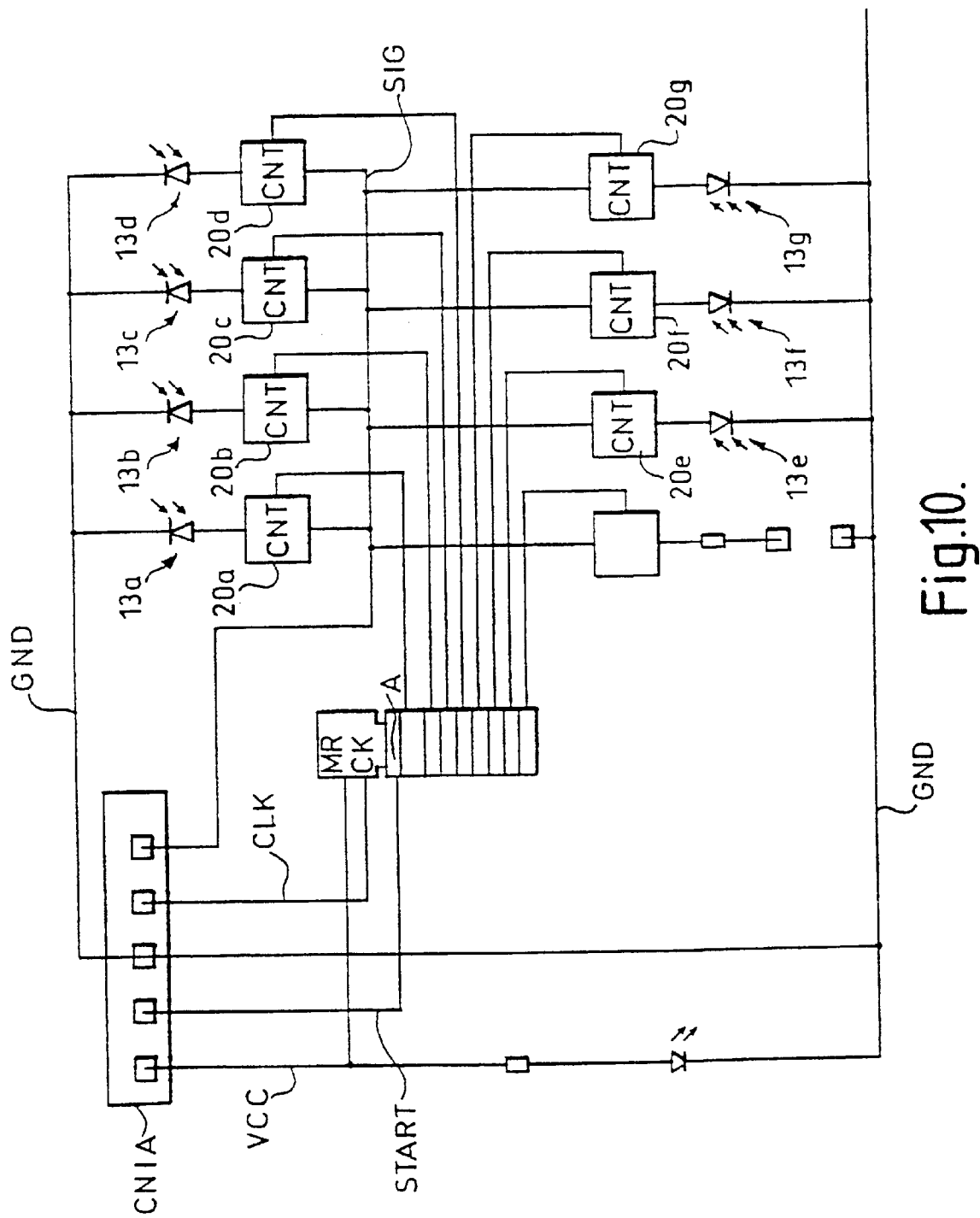
FIG. 10 is a diagram of a subsidiary signal processing circuit associated with light-sensitive detectors elements in an embodiment of the invention.

Within the sensor, the photodiodes 13a . . . 13g are connected to a subsidiary signal processing circuit, shown in FIG. 10. Each of the photodiodes has its cathode connected to ground line GND and its anode connected, through a respective solid-state switch 20a ... 20g to a common signal line SIG. Each switch 20a ... 20g has a control input CNT which is connected to a respective output of a serial-in parallel-out shift register 22.

The shift register 22 has a high-going-edge-triggered reset input MR connected to a positive supply line VCC, and clock and data inputs CP, A connected respectively to clock and data lines CLK, START.

A light-emitting diode LED1 is connected with a series resistor R1 between the positive supply line VCC and ground GND.

Each of the positive supply line VCC, the data line START, the ground line GND, the clock line CLK and the signal line SIG is connected respectively to first to fifth pins of a connector CN1A.

Figure 11:
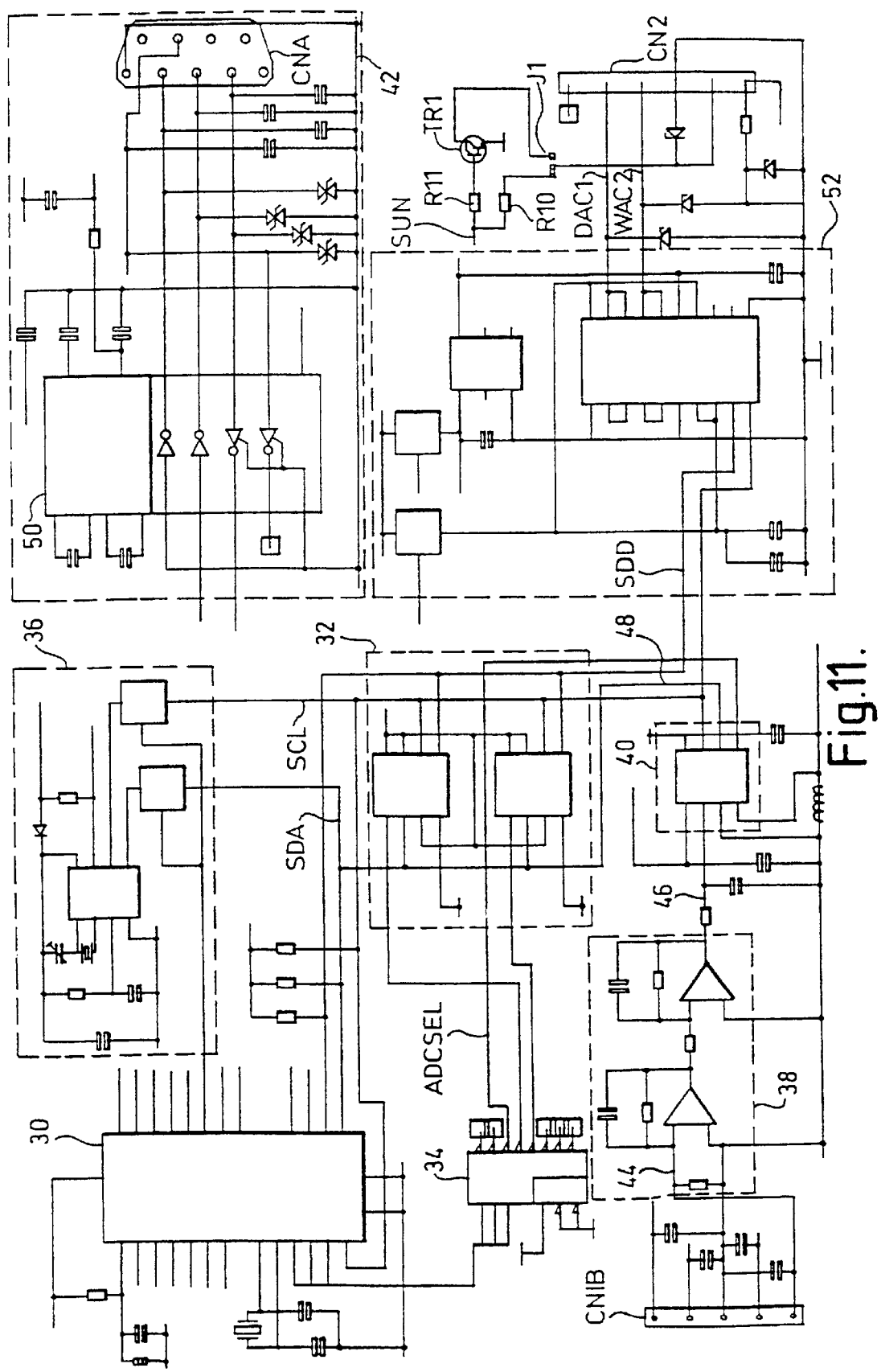
FIG. 11 is a diagram of a primary signal processing circuit for use in an embodiment of the invention.

A primary signal processing circuit, shown in FIG. 11, controls and processes signals received from the subsidiary signal processing circuit. The main functional elements of the primary processing circuit will now be described. Much of the primary processing circuit is of a conventional nature, and will be readily understood from the drawing by a suitably skilled technical person. Those parts of it will not be described here.

The primary processing circuit includes a microcontroller 30 which is connected to EEPROM memory devices 32 by a suitable decoder 34, a common data input line SDA and a common output data line SDD. The microcontroller 30 stores a program to control its operation. The EEPROM memory devices 32 are used to store calibration data and readings taken over time. The primary processing circuit further includes a timer stage 36, a signal amplification stage 38, an analogue to digital conversion stage 40, a digital I/O stage 42, an analogue output stage 52 and other components as will be described below. A power supply circuit (not shown) provides a +5V and 0V supply for the primary processing circuit.

A connector CN1B forms a connection with the connector CN1A of the subsidiary processing circuit. The first and third pins of the connector CN1B are connected respectively to the +5V and 0V power supply lines. The second and fourth pins are connected to respective output lines WANDSTRT, WANDCLK of the microcontroller 30. The fifth pin is connected through a signal line SIG to an input line 44 of the signal amplification stage 38.

The signal amplification stage 38 comprises a two sequential operational amplifiers configured to generate an output voltage on an output line 46 proportional to current on the input line 44.

The output line 44 of the signal amplification stage 38 generates an input for the analogue to digital conversion stage 40, which, in turn, generates a digital output on the common input data line SDA. The analogue to digital conversion stage 40 is activated by a signal appearing on a select line ADCSEL driven by an output of the decoder 34. In this way, the output value of the analogue to digital conversion stage 40 can be read by the microcontroller 30.

The timer stage 36 generates a clock signal on a clock line SCL to generate a periodic signal on an interrupt line RTCINT to initiate a measuring sequence.

The digital I/O stage 42 is connected through receive and transmit data lines Rx, Tx to the microcontroller. Within the digital I/O stage 42 is a transceiver device 50 connected between the receive and transmit data lines Rx, Tx and an external connector CN4, whereby input and output signals on the external connector CN4 can be in accordance with a preferred standard such as RS232. The transceiver device 50 is activated as and when required by signals applied to a control line RS2320N by an output of the microcontroller.

The analogue output stage 52 is connected to the clock line SCL and to a data output line SDD of the microcontroller 30. The analogue output stage 52 has output lines DAC1,DAC2 connected to respective pins of a data output connector CN2. The analogue output stage operates to generate a voltage on its output lines DAC1, DAC2 representing the digital value transmitted to it on the common output data line SDD. These signals represent the values of total and diffuse light falling on the sensor and are suitable for recording by a conventional datalogger.

The microcontroller 30 also has a sunshine indicator output line SUN on which it can place a voltage value to indicate whether or not the sensor is in sunshine. The sunshine indicator output line SUN is optionally connected through a resistor R10 to a pin of the data output connector CN2. Alternatively, it may be connected through a resistor R11 to the base of a transistor TR1, the collector of which is connected to a pin of the data output connector and the emitter of which is connected to ground. Selection between these two alternative configurations is be made by selectively connecting a jumper J1 in one of two alternative positions. A user can thereby select to generate a voltage output or to switch a current-carrying circuit to indicate to external apparatus whether or not the sensor is in sunshine.

Operation of the sensor will now be described.

When power is first applied to the sensor, the microcontroller 30 starts to execute its program. The 10 shift register 22 is reset so that all of the switches 20*a* . . . 20*g* of the photodiodes 13*a* . . . 13*g* are off.

The sensor then operates in cycles, each cycle being initiated by the timer stage 36 generating an interrupt signal on the interrupt line INT.

The microcontroller lowers then raises the WANDSTRT line and applies a pulse to the WANDCLK line. This causes the first output of the shift register 22 to go high, so turning on the first switch 20*a*. The microcontroller 30 then reads and stores the value generated by the analogue to digital conversion stage 40, and so obtains a measurement of the amount of light falling on the first photodiode 13*a*.

The microcontroller 30 lowers the WANDSTRT line and applies a further pulse to the WANDCLK line. This causes the shift register 22 to shift its output by one bit, such that the next one of the output lines goes high, thereby enabling the amount of light falling on the next photodiode 13*b* to be measured. Keeping the WANDSTRT line low ensures that the first output line is not turned on again. This process is repeated until measurements have been taken from all of the photodiodes 13*a* . . . 13*g*.

The microcontroller then analyses the results of the measurements. First, it calculates two values, MIN and MAX where:

MIN is the lowest reading of all the photo diodes 13. This sensor is completely shaded and sees half the diffuse sky, and no direct light.

MAX be the highest reading of all the photodiodes 13. This sensor is completely unshaded, seeing the full direct beam, plus half the diffuse light.

Any partly shaded sensors will give intermediate readings.

Therefore:

The diffuse light value=2×MIN

Direct beam value=Max−Min

Total Incident Light=Max+Min

Sunshine Hours=Time that direct value>Threshold

If the microcontroller determines that the direct beam value exceeds a predetermined threshold, then it raises the sunshine indicator output line SUN. If not, it lowers that line. Additionally, the microcontroller sends data representing the values of total and diffuse light, calculated as described above to the analogue output stage 52, that data being represented as an analogue voltage appearing on the output lines DAC1,DAC2 of the analogue output stage.

The microcontroller can also send data out through the digital I/O stage 42. However, since there is such a wide range of alternative possibilities for the form and content of that data, routinely selectable in accordance with the particular circumstances in which a particular embodiment is to be used, this data will not be further described here.

The particular shape of the pattern applied to the dome is most readily defined in terms of the function that it must perform; namely that it must ensure that at least one detector is always shaded from direct sunlight by an opaque area and at least one detector can always receive direct sunlight through a translucent area. Furthermore, the pattern should ensure that each of the detectors receives an equal amount of light from all parts of the sky hemisphere. Clearly, the layout of the detectors and the shape of the pattern are closely interdependent.

Furthermore, it is desirable to minimise the size of the cover 11 to enable the size of the sensor as a whole to be minimised. It is also desirable to maximise the sensitive area of each of the detectors because this can lead to a greater accuracy of light measurement.

The method adopted by the applicant in order to create a suitable pattern will now be described.

The pattern is generated by means of an iterative process carried out by a computer.

First there is created a software model of the geometrical relationship between the detectors and the pattern. The pattern is treated as a two-dimensional patters which is mapped onto the surface of the dome.

Next, an initial pattern is selected. The type of pattern likely to produce a successful result can be learned from experience, and those illustrated in the accompanying figures can be used for guidance. Initially, a small area for the detectors is assumed.

The pattern is then checked. This is done by modelling in software the effect of projecting the area of each of the detectors onto the dome towards a position that could be occupied by a light source. A test is then made to ensure that at least one of the detectors can "see" the light and that at the light is fully obscured for at least one other detector. If this test fails, the software adjusts the pattern as will be discussed below. The testing process is then repeated with the light source moved by a small distance, which is less than the expected size of the light source in practice, until all possible positions of the light source have been tested. It has been found that moving the source in steps of 0.5° is appropriate forcases in which the sensor is to be used as a sunshine monitor.

If a test fails, the pattern is adjusted by filling or clearing part of it. If it is found that at a particular angle, no detector is fully exposed to light, the detector which is most nearly exposed is selected and part of the pattern is cleared to ensure that it is fully exposed. If it is found that at a particular angle, no detector is fully obscured, the detector which is most nearly obscured is selected and part of the pattern is filled to ensure that it is fully obscured.

The checking and adjustment process is repeated until the test is passed for all angles, at which time the pattern can be deemed to be successful. However, it must be bore in mind that not all initial patterns and arrangements of sensors will produce a successful final pattern.

Once a successful pattern has been found, it can be further improved by increasing the size of the detectors within the software model and re-running the entire procedure of checking and adjustment.

The patterns shown in FIGS. 6 to 9 in an equiangular projection are all produced to work with a layout of seven detectors as described above, with the separation between the centres of the detectors being, respectively, 0.14, 0.16, 0.19 and 0.26 times the diameter of the dome. Experimentation will reveal families of patterns which will work.

What is claimed is:

1. A sunlight sensor comprising at least two light sensitive detectors and a masking element having a pattern of translucent and opaque areas which are disposed to ensure that for any solar declination and any diurnal solar position at least one detector can be exposed to direct sunlight through a translucent area and at least one detector is shaded from direct sunlight by an opaque area wherein the masking element is such that in use the at least two detectors receive substantially equal amounts of diffuse sunlight.

2. A sunlight sensor according to claim 1 wherein the opaque areas of the masking element are provided by a cut out mask of card, metal, plastic sheet or any other suitable material.

3. A sunlight sensor according to claim 1 wherein in which the masking element is disposed within an at least partly translucent cover of the detector.

4. A sunlight sensor according to claim 1 wherein opaque areas of the masking element are constituted by an opaque pattern applied to an at least partly translucent cover of the detector.

5. A sunlight sensor according to claim 4 wherein the pattern of opaque areas are formed an opaque coating applied by printing, painting or spraying onto the internal surface of the cover in selected areas.

6. A sunlight sensor according to claim 4 wherein the pattern of opaque areas is formed by thin opaque material applied to the cover.

7. A sunlight sensor according to claim 3 wherein the cover includes a hemispherical dome.

8. A sunlight sensor according to claim 3 wherein the cover is made of a transparent material.

9. A sunlight sensor according to claim 3 wherein the cover covers all of the detectors.

10. A sunlight sensor according to claim 3 wherein the light sensitive detectors are arranged in a symmetrical pattern.

11. A sunlight sensor according to claim 1, wherein the light sensitive detectors are carried on a generally flat support.

12. A sunlight sensor according to claim 1 wherein the sensor includes six or seven light sensitive detectors.

13. A sunlight sensor according to claim 12 wherein six detectors are arranged equiangularly and equidistantly spaced from a centre point and a seventh detector at the centre point.

14. A sunlight sensor according to claim 1 wherein the translucent and opaque areas are of substantially equal area.

15. A sunlight sensor according to claim 1 wherein the translucent areas are constituted by areas in which a light-obscuring medium is used to form the opaque areas is absent.

16. A sunlight sensor according to claim 1 wherein the pattern of translucent and opaque area of masking element comprise alternating translucent and opaque bands extending as areas of a hemispherical locus.

17. A sunlight sensor according to claim 15 wherein the opaque areas are symmetrical with respect to a diametric line of symmetry.

18. A sunlight sensor according to claim 16 wherein the pattern of opaque areas is such that areas in one diametrical half of the hemispherical locus are symmetrically opposite translucent areas in its other half.

19. A sunlight sensor according to claim 1 wherein the masking element is such that, in use as the sun travels across the sky, direct sunlight can fall on different ones of the detectors in turn and different ones of the detectors can be shaded from direct sunlight in turn.

20. A sunlight sensor according to claim 1 wherein each of the detectors receives light from substantially all parts of the sky away from the sun.

21. A sunlight sensor according to claim 1 wherein in use the sensors lie in a horizontal plane and the masking element is such that the sensor is operable for all orientations of the detectors in that plane.

22. A sunlight sensor according to claim 1 wherein all of the sensors in use receive substantially equal amounts of diffuse sunlight.

23. A sunlight sensor according to claim 1 wherein the masking element is such that in use the sensor is operable irrespective of the location of the sun in the sky.

24. A meteorological monitoring instrument comprising:
   a sensor including at least two light sensitive detectors and a masking element having a pattern of translucent and opaque areas which are disposed to ensure that for any solar declination and any diurnal solar position at least one detector can be exposed to direct sunlight through a translucent area and at least one detector is shaded from direct sunlight by an opaque area, wherein the masking element is such that in use the at least two detectors receive substantially equal amounts of diffuse sunlight; and
   a signal processing apparatus for processing signals derived from the detectors and for generating an output indicative of the incidence of sunlight upon the sensor.

25. A method of distinguishing between sunshine and overcast weather conditions comprising:
   placing a sensor in a position where it is liable to be exposed to sunlight, the sensor including at least two light sensitive detectors and a masking element having a pattern of translucent and opaque areas which are disposed to ensure that for any solar declination and any diurnal solar position at least one detector can be exposed to direct sunlight through a translucent area and at least one detector is shaded from direct sunlight by an opaque area, wherein the masking element is such that in use the at least two detectors receive substantially equal amounts of diffuse sunlight;

assessing signals derived from each of the detectors; and comparing the signals derived from the detector exposed to the greatest and to the least amount of light.

26. A radiation sensor comprising at least two radiation sensitive detectors and a masking element having a pattern of areas at least one of which is opaque to the radiation and at least one of which is transparent to the radiation, which areas are disposed to ensure that at least one detector can be exposed to direct radiation through a non-opaque area and at least one detector is shaded from direct radiation by an opaque area irrespective of where a point source of radiation might be positioned within a detection field, and wherein in use the at least two detectors receive substantially equal amounts of indirect radiation.

27. A sunlight sensor comprising at least two light sensitive detectors and a masking element having a pattern of translucent and opaque areas which are disposed to ensure that for any solar declination and any diurnal solar position at least one detector can be exposed to direct sunlight through a translucent area and at least one detector is shaded from direct sunlight by an opaque area wherein the masking element is such that in use all of the detectors of the sensor receive substantially equal amounts of diffuse sunlight.

28. A sunlight sensor comprising at least two light sensitive detectors and a masking element having a pattern of translucent and opaque areas which are disposed to ensure that for any solar declination and any diurnal solar position at least one detector can be exposed to direct sunlight through a translucent area and at least one detector is shaded from direct sunlight by an opaque area wherein the masking element is such that in use all of the detectors of the sensor receive light from substantially all parts of the sky away from the sun.

29. A sunlight sensor according to claim 28, wherein the masking element has a pattern of translucent and opaque areas which are disposed to ensure that for all solar declinations and all diurnal solar positions at least one detector can be exposed to direct sunlight through a translucent area and at least one detector is shaded from direct sunlight by an opaque area, wherein the masking element is such that in use the sensor is operable irrespective of the location of the sun in the sky.

30. A sunlight sensor comprising at least two light sensitive detectors and a masking element having a pattern of translucent and opaque areas which are disposed to ensure that for all solar declinations and all diurnal solar positions at least one detector can be exposed to direct sunlight through a translucent area and at least one detector is shaded from direct sunlight by an opaque area wherein the masking element is such that in use the at least two detectors of the sensor receive substantially equal amounts of diffuse sunlight, wherein opaque areas of the masking element are constituted by an opaque pattern on an at least partly translucent cover of the sensor, said cover comprising a hemispherical dome, and wherein the pattern of translucent and opaque areas of the masking element includes a plurality of opaque areas, at least one of which extends between at least two separate locations at the periphery of the dome so as to partition the rest of the dome surface area outside of said at least one opaque area into at least two further areas, each of which includes a translucent area.

31. A sunlight sensor according to claim 30, wherein the masking element comprises two continuous opaque areas, each of which includes three opaque sub-areas extending respectively to three locations at the periphery of the dome thereby defining two translucent areas between the opaque sub-areas of each continuous opaque area.

32. A sunlight sensor according to claim 31, wherein the masking element is such that in use each of the detectors receives light from substantially all parts of the sky away from the sun and such that in use the sensor is operable irrespective of the location of the sun in the sky.

* * * * *

UNITED STATES PATENT AND TRADEMARK OFFICE
CERTIFICATE OF CORRECTION

PATENT NO. : 6,417,500 B1
DATED : July 9, 2002
INVENTOR(S) : John Graham Wood

Page 1 of 1

It is certified that error appears in the above-identified patent and that said Letters Patent is hereby corrected as shown below:

Column 2,
Line 14, after "of" delete "the-sensor" and insert -- the sensor --.

Column 4,
Line 34, after "connector" delete "CNIA" and insert -- CN1A --.
Line 54, after "provides a" delete "+SV and OV" and insert -- +5V and 0V --.

Column 5,
Line 20, after "line" delete "RS2320N" and insert -- RS232ON --.

Column 7,
Line 7, before "in" delete "forcases" and insert -- for cases --.
Line 32, insert -- The measures obtained from a sensor embodying the invention may be quantative, providing a measure of actual radiation intensities impinging on the detector(s), or it may be qualitative, registering the time that incident sunlight above a threshold value is sensed. These measures at the least provide an automatic record which can be calibrated to record sunshine hours to a standard which is compatible with the record derived by the Campbell-Stokes recorder, but can also provide a record of the intensity both of diffused and direct sunlight so that the relative clarity or cloudiness of sky may also be monitored.

The instrument simply needs to be aligned horizontally, and can operate automatically from then on, save for replacement of batteries. It is not necessary to move any parts to compensate for seasonal variations in the solar declination, or to change paper recording charts on a daily basis. The orientation of the device with respect to the sun, or its path through the sky is irrelevant, as is the arrangement of the opaque and transparent areas, so long as these areas are equal in extent, and ensure that at least one detector is illuminated by the sun and at least one shaded, whilst the sun is above the horizon. --.

Signed and Sealed this

Twenty-eighth Day of February, 2006

JON W. DUDAS
*Director of the United States Patent and Trademark Office*